April 7, 1942.  C. A. BROWN  2,278,422
THERMOSTATIC VALVE DEVICE
Filed July 1, 1940
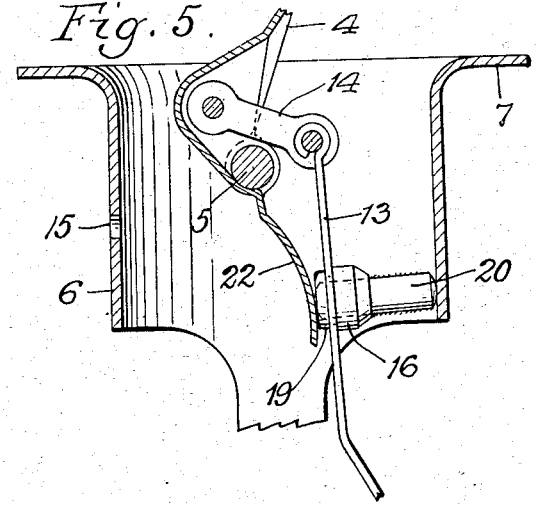
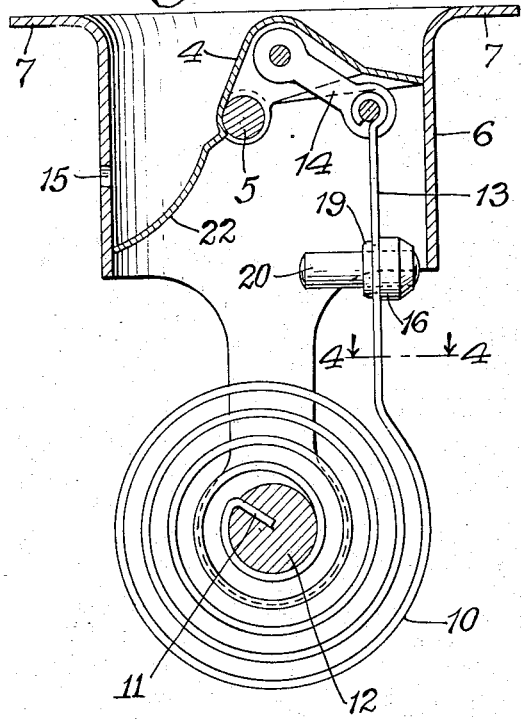
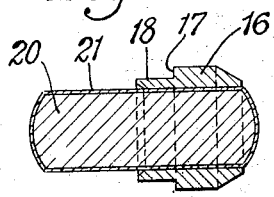
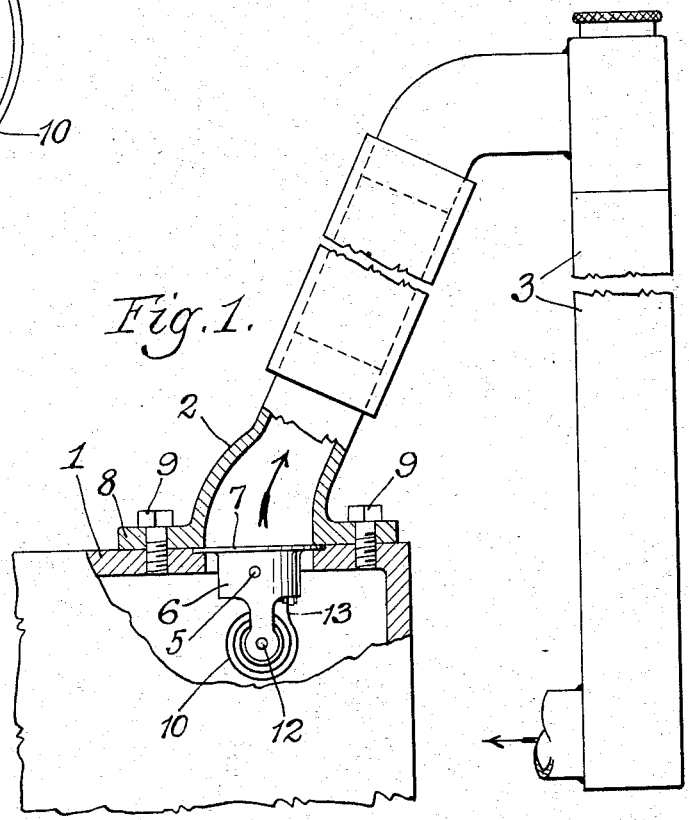
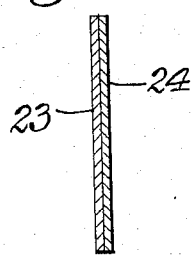
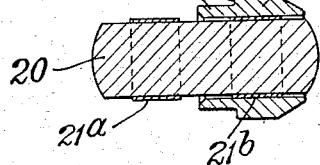
Inventor.
Clyde A. Brown.
by Parker & Carter
Attorneys.

Patented Apr. 7, 1942

2,278,422

UNITED STATES PATENT OFFICE 2,278,422

THERMOSTATIC VALVE DEVICE

Clyde A. Brown, Chicago, Ill., assignor to The Dole Valve Company, Chicago, Ill., a corporation of Illinois Application July 1, 1940, Serial No. 343,364

7 Claims. (Cl. 236—34)

This invention relates to thermostatic valve devices and has for its object to provide a new and improved device of this description.

The invention has as a further object to provide a thermostatic valve device which when the temperature reaches a predetermined point, will render operative a stop device, to hold the valve open thereafter.

The invention may have various uses and as illustrative I have shown its use in the drawing in a circulatory cooling system for internal combustion engines. It is customary to use in the circulatory cooling systems of internal combustion engines, such as those used with automobiles, a thermostatically controlled valve which when the engine is cold, closes the connection to the radiator so that the engine will quickly warm up, the thermostat opening this valve after the temperature reaches a predetermined point and the engine has been sufficiently warmed up. The present invention has as one of its objects to provide a thermostatic valve device by means of which the valve will be held open in the event an excessive temperature of the engine has been brought about for any reason, such as the lack of sufficient cooling liquid for the engine, and which will prevent the closing of this valve after the engine has cooled. The invention has as a further object to provide means for locking the valve in the circulatory cooling system in an open position after the engine has been overheated. The invention has further objects which are more particularly pointed out in the accompanying description, the valve construction herein shown is not claimed herein but is claimed in my earlier application, Serial No. 283,426, filed July 8, 1939. The means herein claimed for preventing the valve from being closed after the engine has been overheated may be used with any suitable form of valve.

Referring now to the drawing, Fig. 1 is a view showing one form of the device embodying the invention in position in the circulatory cooling system of an internal combustion engine;

Fig. 2 is an enlarged view in part section through the valve casing;

Fig. 3 is a view of the locking pin and the bushing in which it is placed, in section;

Fig. 4 is an enlarged sectional view taken on line 4—4 of Fig. 1;

Fig. 5 is a view similar to Fig. 2, with the parts in position to hold the valve open after the parts have cooled; and Fig. 6 is a view similar to Fig. 3, showing a different disposition of the solder.

Like numerals refer to like parts throughout the several figures.

Referring now to the drawing, I have shown a portion 1 of an internal combustion engine jacket which is connected by a pipe or connection 2 with the radiator 3. In this connection at any suitable point is a valve 4 which is mounted in any suitable manner, as, for example, by being pivotally mounted at 5 in the casing 6. This casing has a laterally projecting edge 7 which is clamped between the engine jacket 1 and the flange 8 on the connection 2 by means of the fastening devices 9.

A bimetal thermostat 10 is herein shown in the form of a coil having one end 11 fastened to a shaft 12. The other end 13 is attached to the valve 4 in any desired manner, as by means of the link 14. There is a bleed hole 15 in the casing.

The parts are so arranged that when the engine is cold the valve is closed, as shown in Fig. 2. When the engine warms up sufficiently, the thermostat moves the valve from its closed position shown in Fig. 2, to its open position, so that the cooling liquid may be circulated through the radiator 3 so as to be cooled.

Some means is provided for locking the valve 4 in its open position in the event the engine becomes overheated, so that the valve will remain open thereafter until the injury is repaired or a new valve placed in position. I have illustrated one means for securing this result. In this construction an opening is made in the bimetal strip at some point opposite the casing 6 and there is placed in this opening a bushing 16 which is provided with a shoulder 17 and a reduced portion 18. The bushing is inserted in the opening in the bimetal strip until the shoulder 17 engages the strip, as shown in Fig. 2. The bushing is fixed in position in any desired manner, as, for example, by turning over the edge 19 so that the bimetal strip is clamped between the shoulder 17 and the edge 19. A pin 20 is inserted in the bushing 16 and is held therein by solder which melts at a comparatively low temperature. This solder is indicated at 21 in Fig. 3.

The solder used, for example, maintaining its solidity at the ordinary temperatures at which the engine is operated. When the temperature rises above the ordinary or normal temperature a sufficient amount to endanger or injure the engine or the thermostat, this solder softens up sufficiently to release the pin. This excessive temperature causes the part 22 of the valve 4 to be moved into contact with the pin 20 and since the pin is loosened by the softening up of the solder, this moves the pin through the bushing and the bimetal strip, causing it to engage the casing 6. When the engine cools below the softening or melting point of the solder, the solder becomes sufficiently hard to hold the pin in position so that the bimetal strip cannot move toward the casing to cause the valve to close, thus holding the valve open when the engine cools and maintaining the valve in this open position.

The softening or melting point of the solder used will of course depend upon the conditions presented. Injury, for example, to the engine or to the thermostat does not occur when the temperature is below 212 degrees Fahrenheit. The thermostat is adjusted, for example, to open the valve before the engine becomes sufficiently heated to cause injury either to the engine or to the thermostat. Ordinarily the thermostat is set to fully open the valve at approximately 180 degrees Fahrenheit. The solder used, therefore, is such as to soften up sufficiently when the temperature of the cooling liquid in the engine jacket rises above 212 degrees Fahrenheit, to the danger point or to a point that approaches the danger point, to permit the pin to loosen so that it can be pushed through the bimetal strip. This temperature causes the part 22 of the valve to move over to engage the pin 20 and slide it in the bushing and the end 13 of the thermostat until the end 22 of the valve comes in contact with the end 17 of the bushing. In this position the pin engages the casing, as shown, for example, in Fig. 5. As the temperature of the parts lowers, the solder hardens so as to hold the pin in this position, thereby causing the end 13 of the thermostat to be held in position to thereafter hold the valve open, even when the parts are entirely cold.

The thermostat may be of any suitable form. I prefer to make this thermostat of bimetal consisting of two strips fastened together, having different coefficients of expansion, one strip, for example, the strip 23, being of non-ferrous metal and the strip 24 being of ferrous metal. The thermostat is preferably so arranged that the end 13 attached to the valve does not move across the valve casing so as to materially obstruct the flow of the liquid therethrough. This result is secured by winding the bimetal strip on the shaft 12 so that the heating of the bimetal causes the coil to move in a winding direction, that is, to wind up on the shaft 12. This causes the end 13 of the bimetal strip to change its position from that shown in Fig. 2 to that shown in Fig. 5, where it does not materially obstruct the flow of liquid through the valve casing. When the bimetal cools, with this construction, the cooling causes it to move in an unwinding direction about the shaft 12.

The solder may be applied to the parts in any desired manner. It may be applied to the pin 20 alone or to the bushing and the pin or to the bushing alone, the only requirement being that it will hold the pin in the bushing under normal temperatures and will soften so that the pin may be pushed through the bushing at abnormal temperatures, and will then harden to hold the pin in this latter position when the temperature lowers a predetermined amount.

One of the simplest ways of utilizing the solder is to simply immerse the pin 20 in the solder, whereupon the pin becomes coated with this solder 21, as shown in Fig. 3. The solder, for example, may be arranged so that a portion of it 21a is outside of the bushing and another portion 21b is inside of the bushing. In this construction when the high temperature is reached and the solder softens, the valve engaging the pin 20 moves it into the bushing so that the solder 21a is moved into the bushing and this solder cools when the temperature has been reduced sufficiently and holds the pin in position and the valve in its open position. The solder is preferably such that it hardens sufficiently to hold the parts at a temperature higher than that required to open the valve to its fully open position. It is of course understood that whatever flux is required in connection with the solder may be used. Any suitable solder may be used. I have found, for example, that very good results are secured with a solder made from an alloy of tin, lead and bismuth, as follows: tin, 56 percent; lead, 32.9 percent; bismuth 11.1 percent.

The use and operation of my invention are as follows.

When the thermostatic valve device is to be used it is placed in position where the thermostatic coil is in position to be heated, the valve being normally closed when the parts are cool. As the coil heats, the two strips of bimetal having different coefficients of expansion, expand so as to move the valve from its closed to its open position. If the device becomes overheated, that is becomes heated to a temperature where injury would result either to the thermostat or to any other device with which the valve is used, the solder holding the pin 20 in position in the bushing 16, softens and the end 22 of the valve engages the pin 20 and moves in the bushing until the end comes opposite the part 19 of the bushing. In this position the other end of the pin strikes the valve casing 6. When now the temperature lowers, the solder hardens as this temperature lowers, so as to again fix the pin in the bushing 16 and hold it with its end engaging the casing 6, thereby holding the parts so that the valve will be maintained in its open position after the parts have become cold.

When the device, for example, is used with internal combustion engines, it will be seen that if the engine can, after this abnormal temperature, be again started, the valve will remain open and the circulation through the radiator be maintained at all times.

I claim:

1. A thermostatic valve device comprising a casing, a valve mounted therein, a thermostatic element connected with said valve, to move it to its open position when a predetermined temperature is reached, and a stop for holding said valve in an open position, after the parts are cool, when an abnormal temperature is reached during the operation of the device, said stop actuated by and moved into its operative position by the thermostatic element.

2. A thermostatic valve device comprising a casing, a valve mounted therein, a thermostatic element connected with said valve, to move it to its open position when a predetermined temperature is reached, a stop device connected with said thermostatic element and normally in an inoperative position, and means for utilizing said thermostatic element to move said stop device to an operative position when the thermostatic element is subjected to an abnormal temperature, so as to stop the closing movement of said valve and hold said valve open when the parts are cool.

3. A thermostatic valve device comprising a casing, a valve pivotally mounted therein, having a portion projecting on opposite sides of the pivot, a thermostatic element connected with said valve, a pin connected with said thermostatic element in proximity to said valve and projecting toward the interior of the casing, solder connecting said pin with said thermostatic element, said solder softening when the temperature to which it is subjected reaches a predetermined abnormal point, said thermostatic element connected with said valve so that when the thermostatic element is subjected to an abnormal temperature to soften said solder, a portion of the valve engages said pin and moves it toward the casing, to cause it to engage said casing, said solder when cooled locking said pin in its operative position to hold the valve in its open position.

4. A thermostatic valve device comprising a casing, a valve pivotally mounted therein, and a thermostatic element having a coil having one end connected with a fixed point and the other end connected with said valve, said coil coiled about the fixed point so that the coil is moved in a winding up direction when the thermostatic element moves the valve toward its open position, a pin connected with said thermostatic element in proximity to said valve and projecting toward the interior of the casing, solder connecting said pin with said thermostatic element, said solder softening when the temperature to which it is subjected reaches a predetermined abnormal point, said thermostatic element being connected with said valve so that when the thermostatic element is subjected to an abnormal temperature to soften said solder, a portion of the valve engages said pin and moves it toward the casing to cause it to engage the casing, said solder when cooled locking said pin in its operative position to hold the valve in its operative position.

5. A thermostatic valve device comprising a casing, a valve pivotally mounted therein, a thermostatic element having a coil having one end connected with a fixed point, a link connected with said valve and with the other end of said thermostatic element, said coil coiled about the fixed point so that the coil is moved in a winding direction when the thermostatic element moves the valve toward its open position, a stop device connected with said thermostatic element and normally in an inoperative position, and means for utilizing said thermostatic element to move said stop device to an operative position when the thermostatic element is subjected to an abnormal temperature, so as to stop the closing movement of said valve and hold said valve open when the parts are cooled.

6. A thermostatic valve device comprising a casing, a valve pivotally mounted therein, a thermostatic element having a coil having one end connected with a fixed point and the other end connected with said valve, said coil coiled about the fixed point so that the coil is moved in a winding direction when the thermostatic element moves the valve toward its open position, and means attached to said thermostatic element and moving therewith for holding said valve in an open position, after the parts are cool, when an abnormal temperature is reached during the operation of the device.

7. A thermostatic valve device comprising a casing, a valve pivotally mounted therein, a thermostatic element connected with said valve to move it to its open position when a predetermined temperature is reached, a stop device associated with said valve and normally in an inoperative position, and means attached to said thermostatic element and moving therewith and brought into operation responsive to said thermostatic element, for rendering said stop device operative to stop the closing movement of the valve and hold the valve open when the parts are cool.

CLYDE A. BROWN.